United States Patent [19]

Vamaraju et al.

[11] 4,305,001

[45] Dec. 8, 1981

[54] CONSTANT FREQUENCY ALTERNATOR

[75] Inventors: S. R. Murthy Vamaraju; Andrew F. Szippl, both of Lima, Ohio

[73] Assignee: Lima Electric Company, Inc., Lima, Ohio

[21] Appl. No.: 15,294

[22] Filed: Feb. 26, 1979

[51] Int. Cl.³ .............................................. H02P 9/36
[52] U.S. Cl. ........................................ 290/5; 290/6; 322/61
[58] Field of Search ...................... 290/5–8; 322/23–25, 59–61, 63, 64

[56] References Cited

U.S. PATENT DOCUMENTS

| | | | |
|---|---|---|---|
| 2,831,156 | 4/1958 | Mathews, Jr. et al. | 322/61 X |
| 3,070,740 | 12/1962 | Chirgwin et al. | 322/61 X |
| 3,183,431 | 5/1965 | Ford | 322/61 X |
| 3,210,644 | 10/1965 | Sparrow | 322/25 |

Primary Examiner—J. V. Truhe
Assistant Examiner—W. E. Duncanson, Jr.

Attorney, Agent, or Firm—Maky, Renner, Otto & Boisselle

[57] ABSTRACT

A double induction dynamo electric machine of the exciter-generator type provides an AC electrical output that has a substantially constant frequency characteristic by using a closed frequency loop arrangement without requiring electronic controls or, in most instances, continuous application of an externally derived AC excitation signal. Moreover, the machine preferably provides such AC electrical output with a substantially constant voltage characteristic as the load current varies, without electronic voltage feedback controls. The machine includes an exciter for developing an AC signal, a generator excited by such AC signal for generating such AC electrical output, coupling means for directly electrically coupling the generator to the exciter to provide an AC excitation signal to energize the latter to produce such AC signal and thereby to close a frequency loop, and a relationship of the exciter and generator that obtains a net cancellation of the influence of mechanical rotational frequency of the machine on the frequency of the AC electrical output therefrom.

81 Claims, 9 Drawing Figures

CONSTANT FREQUENCY ALTERNATOR

TECHNICAL FIELD

The present invention relates generally to dynamo electric machines and, more particularly, to a constant frequency alternator machine which in response to a mechanical input from a prime mover produces an AC electrical output that has a frequency characteristic, and preferably a voltage characteristic, as well, that are substantially independent of the rotational frequency of such mechanical input.

BACKGROUND OF PRIOR ART

A prior synchronous induction dynamo electric machine is disclosed in Sparrow U.S. Pat. No. 3,210,644, which is assigned to the assignee of the present application. Such prior dynamo electric machine includes a combination exciter and generator, each having relatively movable rotor and stator portions, with the rotor portions being mounted on a common shaft or separate shafts for rotation in response to a mechanical input by one prime mover or separate prime movers. The exciter stator is energized with an AC electrical signal, which induces a corresponding AC electrical signal in the rotating exciter rotor that is coupled to the generator rotor through a rectifier circuit to deliver a substantially DC signal thereto. The DC energized rotating generator rotor, which is of the salient pole type, induces an AC electrical output in the generator stator, which is coupled, for example, to an electrical load. Since the signal which effectively energizes the generator, i.e. that delivered from the exciter rotor to the generator rotor, is a DC signal, the rotational frequency of the exciter rotor is not particularly influential on the frequency of the AC electrical output from the generator stator; however, the frequency of such AC electrical output will be a function of the rotational frequency of the generator rotor and the number of poles of the generator.

In such prior dynamo electric machine at least a portion of the exciter stator is connected in shunt across a portion of the generator stator from which voltage electrical signal for energizing a portion of the exciter stator winding is derived. The remaining portion of the exciter stator winding also may be connected in series with the generator stator winding to receive the load current or a current proportional thereto and thereby to provide a compounding effect. Such a machine is described in greater detail in U.S. Pat. No. 3,210,644. The frequency characteristic of such AC electrical output, however, will depend on the rotational frequency of such mechanical input. Permanent magnets mounted in the generator rotor provide an initial magnetic field to commence production of at least a small AC electrical output upon start-up and which in turn aids the build up of rated or full voltage. Advantages of such machine include quick and automatic voltage regulation and recovery of voltage on sudden application of a load without requiring a separate regulator.

In some instances it is desirable that the AC electrical output from an electric generating machine have a substantially constant frequency, i.e. one that is substantially independent of the rotational frequency of the mechanical input thereto. In the past some machines for effecting such constant frequency AC electrical output have included electronic frequency monitoring feedback controls, such as frequency changers, that monitor the frequency of the AC electrical output from the generator stator and suitably adjust the frequency of an electrical signal that is delivered to energize the exciter stator. Such electronic controls increase the cost of such machines and in general tend to decrease the reliability thereof, as is well known.

U.S. Pat. No. 2,831,156 dicloses that a constant frequency AC electrical output can be produced by a double induction machine by supplying to the exciter of the machine a controlled frequency AC excitation signal from an external source and obtaining a net cancellation of the influence of mechanical rotational frequency on the frequency of the AC electrical output from the generator of the machine. The frequency of the AC electrical output, then, will correspond to that of such externally derived AC excitation signal. A drawback to such a system is the continuous need for the external frequency source to provide an input to the machine. The machine of such patent also uses an electronic voltage feedback circuit including a variable gain amplifier for controlling the voltage of the AC electrical output from the generator stator.

In induction motors slip frequency voltages are induced in the rotor circuits causing slip frequency currents to flow in the rotor circuits. Slip is defined, as follows:

$$s = \frac{N_s - N}{N_s}$$

where $N_s$ is synchronous speed of the rotating magnetic field on the stator equal to $120f/P$; N is speed of rotor rotation; f is frequency in Hz; and P is pole number of the winding.

Moreover, in a wound rotor induction motor the rotor is normally wound with the same pole number as the stator; a squirrel cage rotor adapts itself to the stator magnetic field of any pole number so that the squirrel cage rotor pole number is the same as the stator pole number. The slip frequency currents flowing in the rotor conductors produce a magnetic field which rotates at a speed with respect to the rotor known as the slip speed $sN_s$, which according to the above equation equals $N_s - N$. Such magnetic field rotates in the same direction as the rotor. Thus, the magnetic field due to rotor currents rotates at the synchronous speed $N_s$ with respect to the stator or any stationary object of the machine; such field may be said to have a speed $N_s$ in space and would oppose the field created by the stator. The rotor field induces fundamental frequency voltages in the stator windings.

As the rotor field rotates at synchronous speed in space it continues to induce fundamental frequency currents in the stator, whether the rotor is of the wound rotor or squirrel cage type. A rotor load leads to a reduction in speed, i.e. an increase in slip, and generally results in larger rotor currents which are reflected by equivalent fundamental frequency currents in the stator windings being supplied from the input source to which the stator is connected.

The just-described principle of induction motor operation has been extended to double induction dynamo electric machines. In such a double induction machine, assuming the first (exciter) stator is supplied with currents (an AC excitation signal) of a given frequency, slip frequency voltages are generated in the first (exciter) rotor, as the latter rotates with respect to the former.

The second (generator) rotor acts like a load on the exciter rotor. If both the exciter and generator are wound for the same number of poles, the resulting currents flowing in the second rotor produce a magnetic field in the generator which rotates at the same speed in space as the synchronous speed of the magnetic field of the first stator. This second magnetic field, then, generates voltages in the second stator winding at a frequency which is the ame as that of the AC excitation signal applied to the first stator winding.

The foregoing brief description of the principle of operation of a double induction machine presumes that the exciter and generator either have respective wound rotors that are coupled electrically in reverse phase sequence relative to each other and, for facility, are mounted on a common shaft for rotation at a same mechanical rotational frequency, or that a single squirrel cage rotor is associated with both the exciter stator and generator stator. These are the cases in the preferred embodiments of the present invention and also are the illustrated mechanical embodiments disclosed, for example, in the above-mentioned U.S. Pat. No. 2,831,156.

BRIEF SUMMARY OF INVENTION

In accordance with the present invention a dual induction dynamo electric machine of the exciter-generator type, for example similar to that disclosed in U.S. Pat. No. 3,210,644, the disclosure of which is hereby incorporated by reference, provides an AC electrical output that has a substantially constant frequency characteristic by using a closed frequency loop arrangement without requiring electronic controls or in most instances continuous application of an externally derived AC excitation signal. Moreover, the machine in accordance with the invention also preferably provides such AC electrical output with a substantially constant voltage characteristic also without electronic voltage feedback controls.

Briefly, the machine of the present invention includes an exciter for developing an AC signal, a generator excited by such AC signal for generating such AC electrical output, coupling means for directly electrically coupling the generator to the exciter to provide an AC excitation signal to energize the latter to produce such AC signal, and a relationship of the exciter and generator that obtains a net cancellation of the influence of mechanical rotational frequency of the machine on the frequency of the AC electrical output therefrom. Each of the exciter and generator includes relatively movable stator and rotor portions, which are so constructed and electrically connected as to provide a closed frequency loop.

A tapped portion of the generator stator supplies to the exciter stator an AC excitation signal, which has the same frequency as the AC electrical output and, in fact, may be a portion of the latter. In response to such AC excitation signal the exciter stator develops a rotating magnetic field having a rotational frequency in space directly proportional to the frequency of such excitation signal. As the exciter rotor is rotated, the effective rotational frequency of such exciter magnetic field seen by the exciter rotor is the summation or difference of the rotational frequency of the magnetic field in space and the mechanical rotational frequency of the exciter rotor. In response to such magnetic field the exciter rotor produces such AC signal at a frequency that is directly related to the effective frequency of the magnetic field as seen by the exciter rotor. The exciter rotor and generator rotor are connected directly in a phase-sequence manner so that the generator rotor produces in the generator a further rotating magnetic field having a rotational frequency relative to the rotor directly proportional to the frequency of such AC signal. As seen by the generator stator, though, the generator magnetic field has an effective rotational frequency in space directly related to an opposite signed algebraic combination of such AC signal and the rotational frequency of the generator rotor. Therefore, the effect on the frequency of the AC electrical output by the components of the magnetic fields and electrical signals occurring in the dynamo electric machine due to the mechanical rotational frequency of the rotor portions thereof is effectively cancelled. Accordingly, the dynamo electric machine of the invention is a closed frequency loop system that maintains a constant frequency AC electrical output as variations in the rotational frequency of the rotor portions thereof may vary over a relatively wide range.

To establish the frequency of such AC electrical output, a control source, which provides a control voltage having the desired frequency, is coupled to the dynamo electric machine during start-up. For example, such control voltage may be supplied as the AC excitation signal to the exciter stator during start-up of the machine whereby the AC electrical output produced thereafter will have the same frequency as that of the control voltage. After start-up of the machine, the control source generally may be disconnected, for the closed frequency loop of the machine will continue to maintain the frequency of the AC electrical output, or may be left connected to the machine to provide additional power therefor, for example, during heavy load conditions.

Moreover, the magnitude of the AC excitation signal delivered to the exciter stator from the generator stator preferably has at least a component that is proportionally representative of the load energized by the generator stator. Thus, a positive feed-back is obtained in a manner similar to that described in U.S. Pat. No. 3,210,644 to maintain the voltage of the AC electrical output at a substantially constant magnitude with quick recovery characteristics substantially independent of both the speed of the machine and the load applied thereto.

In contrast to the disclosure of U.S. Pat. No. 3,210,644, the generator rotor of the present invention is preferably of the non-salient pole type since it carries an AC signal. In one embodiment of the present invention the generator rotor is wound in a manner similar to that of awound-rotor induction motor; the exciter rotor is similarly wound. In another embodiment a squirrel cage rotor with the discrete conductors thereof extending through both the generator and exciter rotor portions is used. Thus, as used herein, the terms "rotor" and "rotor portion" on occasion may be used interchangeably and in connection with the exciter or generator mean a separately wound rotor associated therewith or that portion of a common rotor, such as that of a squirrel cage type, directly associated therewith. The terms "stator" and "stator portion" also on occasion may be used interchangeably.

The generator stator, generator rotor, exciter stator and exciter rotor all preferably are wound or otherwise formed to have the same number of poles and preferably are star connected although they, or any one or more of them, also may equivalently be delta connected, usually with an increase in the number of turns by a factor of the square root of 3, as is well known. Moreover, preferably the dynamo electric machine is described below by example for three phase operation and is so wound; however, it will be appreciated that the principles of the invention may be adapted for use in connection with fewer or more than three phase operation.

As is described further below, the invention comprehends several embodiments, several of which have different circuit connections for the exciter stator with respect to the control source, the generator stator, or both, with various advantages of the individual embodiments being noted.

With the foregoing in mind, it is a primary object of the present invention to provide a dynamo electric machine preferably of the double induction type that is improved in the noted respects and, in particular, is capable of producing an AC electrical output that has a substantially constant frequency characteristic.

A further object is to provide a closed frequency loop in a machine for generating an AC electrical output at a constant frequency.

Another object is to provide from a dynamo electric machine an AC electrical output that has substantially constant frequency and voltage characteristics, and, more specifically, such constant characteristics that are substantially independent of the speed of the mechanical input to such machine and/or the electrical load energized thereby.

An additional object is to improve the efficiency and to minimize the cost of a dynamo electric machine which produces an AC electrical output having a constant frequency characteristic and preferably additionally a constant voltage characteristic.

Still another object is to facilitate the generating of an AC electrical output having a constant frequency characteristic and preferably also a constant voltage characteristic.

Still an additional object is to produce an AC electrical output having a substantially constant frequency characteristic without requiring electronic frequency changer type controls or in some cases constant reliance on the input of an externally derived AC excitation signal to obtain frequency control.

These and other objects and advantages of the present invention will become more apparent as the following description proceeds.

To the accomplishment of the foregoing and related ends, the invention, then, comprises the features hereinafter fully described in the specification and particularly pointed out in the claims, the following description and the annexed drawings setting forth in detail certain illustrative embodiments of the invention, these being indicative, however, of but several of the various ways in which the principles of the invention may be employed.

DESCRIPTION OF THE PREFERRED EMBODIMENTS

Figures 1, 2, 3, 4:
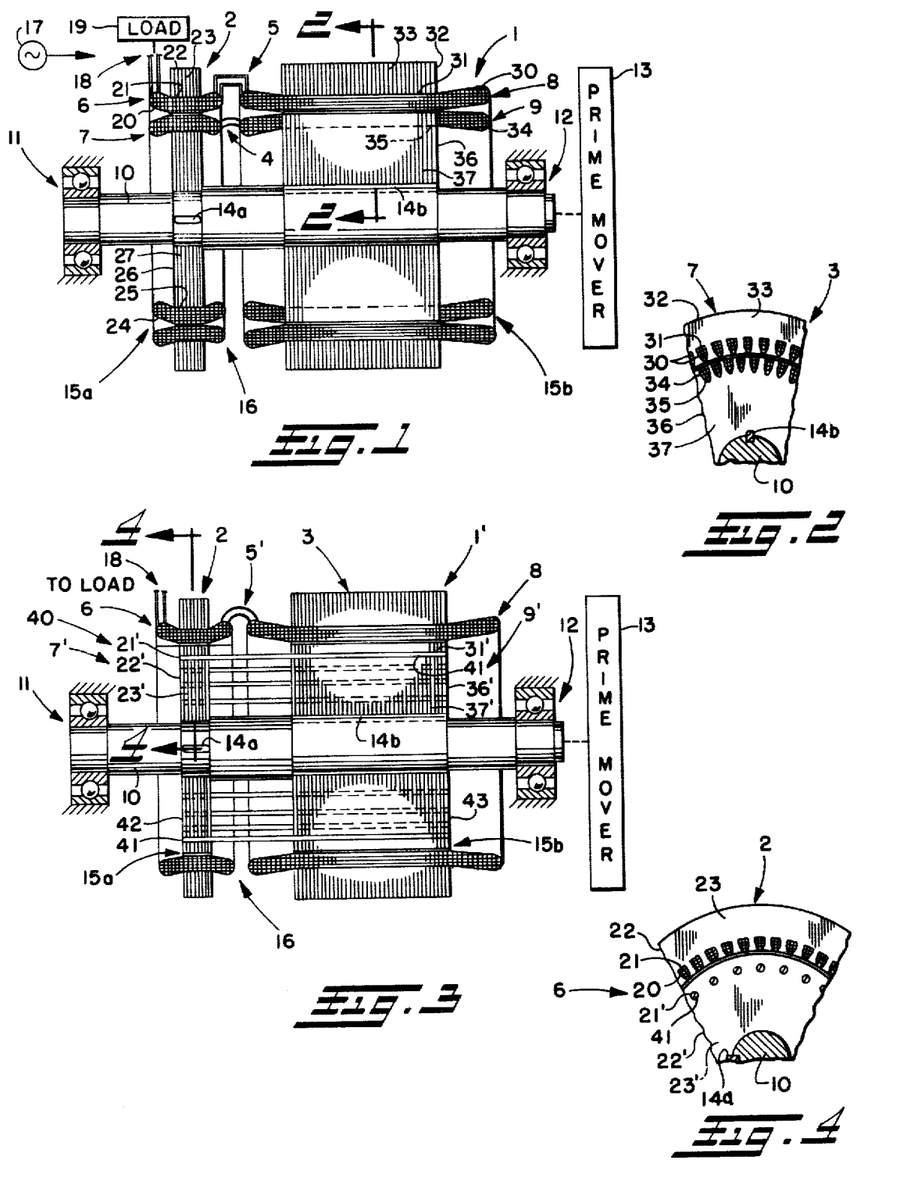
FIG. 1 is a digramatic, fragmentary sectional view of a dynamo electric machine in accordance with the present invention.
FIG. 2 is a fragmentary section view of the generator stator and rotor looking generally in the direction of the arrows 2—2 of FIG. 1; a fragmentary section view taken similarly through the exciter stator and rotor of FIG. 1 would appear similar to FIG. 2 wherein the dimensions of slots may be different.
FIG. 3 is a diagrammatic, fragmentary sectional view of an alternate embodiment of dynamo electric machine in accordance with the invention employing a common squirrel cage type rotor for the generator and exciter.
FIG. 4 is a fragmentary section view through the exciter stator and rotor looking generally in the direction of the arrows 4—4 of FIG. 3; a fragmentary section view taken similarly through the generator stator and rotor would appear similar to FIG. 4, wherein the dimensions of stator slots may be different.

Referring now in detail to the drawings, wherein like reference numerals designate like parts in the several figures, and initially to FIGS. 1 and 2, a dual induction dynamo electric machine in the form of a constant frequency alternator is generally indicated at 1. The fundamental components of such machine include an exciter 2 for developing an AC signal in response to an AC excitation signal input, a generator 3 excited by such AC signal provided thereto via rotor leads 4 to generate the AC electrical output of the machine 1, and a coupling means in the form of stator leads 5 for directly electrically coupling the generator to the exciter to provide the AC excitation signal thereto. Moreover, the exciter 2 and generator 3 are so constructed and electrically connected as to provide a relationship that obtains a net cancellation of the influence of mechanical rotational frequency of the machine on the frequency of the AC electrical output therefrom, as is described in detail below. The exciter 2 includes a stator 6 and rotor 7, and the generator 3 includes a stator 8 and rotor 9. The stators and rotors 6-9 preferably are so constructed and electrically connected as to provide a closed frequency loop, and due to such loop and the noted cancellation, the frequency characteristic of the AC electrical output from the machien 1 will remain constant over a relatively wide range of mechanical rotational frequencies of the machine.

Figure 9:
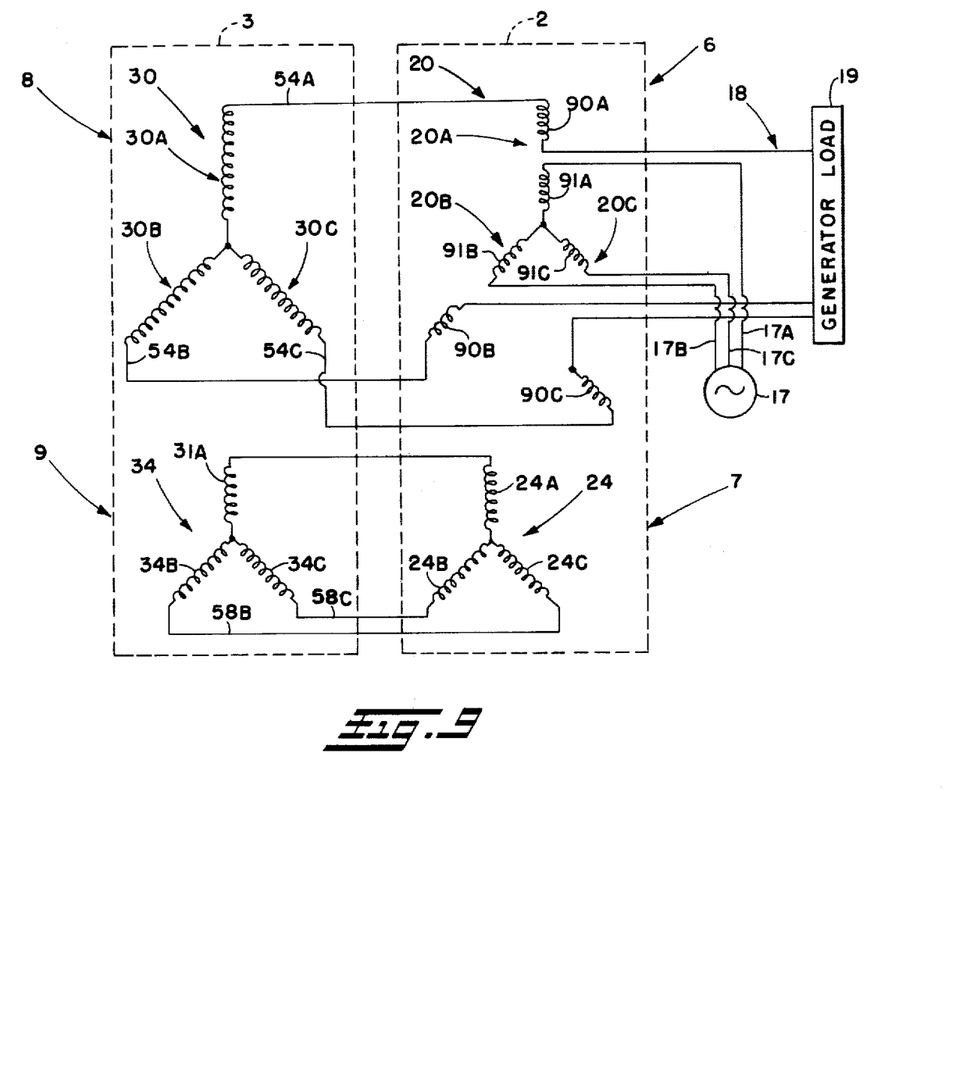

In the preferred embodiment the rotors 7, 9 are mounted on the common shaft 10, which is supported in one or more bearings, such as bearings 11,12, for rotation at a mechanical rotational frequency determined by the mechanical input from a prime mover 13, such as an engine, motor or the like. The rotors 7,9 are fixed in position on the shaft 10 by keys 14a, 14b, and, accordingly, are turned at the same rotational frequency. It will be appreciated, however, that, if desired, the rotors 7, 9 may be mounted on separate shafts and driven by either the same or separate prime movers. Preferably the stators 6, 8 are supported in fixed position relative to the prime mover. Moreover, the machine 1 preferably is of the brushless type such that the rotors 7, 9 are electrically connected to each other but not to external parts that are not rotating at a common rotational frequency therewith; therefore, for convenient and efficient mechanical construction and electrical connections of the machine 1, the rotors 7, 9 are positioned within respective volumes circumscribed by the stators 6, 8, although, if desired, the rotors may be mounted externally of the stators. An air gap 15a separates the exciter stator 6 and rotor 7, and an air gap 15b separates the generator stator 8 and rotor 9; while a nonmagnetic air space 16 separates the exciter 2 from the generator 3. A control source 17 provides an initial AC excitation signal during start-up of the machine 1 to energize the exciter 2 at a controlled frequency specified by such control source. After the machine 1 has been started up and is producing its AC excitation signal on output leads 18, which may be coupled to an electrical load 19, the control source 17 ordinarily may be electrically disconnected from the machine 1, and the machine itself will continue to produce its AC electrical output at the frequency at which it was so initially energized by the control source. Alternatively, the control source 17 may remain connected to the machine 1, and must remain connected when the circuit configuration of FIG. 9 is employed, to provide added power capability therefor, for example, to help maintain a desired magnitude of AC electrical output in response to heavy or rapidly switched loads 19.

Preferably the construction of the exciter stator 6, exciter rotor 7, and generator stator 8 is substantially the same as the corresponding parts of the machine disclosed in U.S. Pat. No. 3,210,644. More specifically, the exciter stator 6 includes a plurality of windings 20 placed in slots or grooves 21 of a laminated core structure 22 formed by a stack of relatively thin magnetic laminations 23. Similarly, the exciter rotor 7 includes windings 24 located in slots or grooves 25 of a laminated core structure 26 formed by a stack of relatively thin magnetic laminations 27. The rotor core 26 is secured in place on the shaft 10 by the key 14a. The exciter stator 6 and rotor 7 are designed to carry respective AC electrical signals, and, accordingly, are of the non-salient pole type configuration. Preferably the stator 6 and rotor 7 have the same pole number, an even number with a pole number of 4 being most preferred according to the best mode of the invention, and may be wound in single phase or multiple phase configuration, with three phase being preferred according to the best mode of the invention.

The generator stator 8 is similar in construction, although larger, to the exciter stator 6, including, for example, windings 30 located in respective grooves or slots 231 in a laminated core structure 32 formed by a stack of relatively thin magnetic laminations 33, as is also seen in FIG. 2. In contrast to the generator rotor disclosed in U.S. Pat. No. 3,210,644, which carries a DC signal and, therefore, is preferably of salient pole configuration, the generator rotor 9 of the present invention carries an AC signal and, accordingly, preferably is of a round, non-salient pole configuration. As is illustrated in FIGS. 1 and 2, the generator rotor 9 is wound to conduct an AC signal like a wound rotor of an induction motor and includes windings 34 located in grooves or slots 35 of a laminated core structure 36 formed of a stack of relatively thin magnetic laminations 37. The core 36 is fixed on the shaft 10 by the key 14b (FIG. 2). The generator stator 8 and rotor 9 may be wound in single phase or multiple phase configuration and preferably are of three phase configuration; preferably the stator 8 and rotor 9 have the same pole number.

Figure 7:
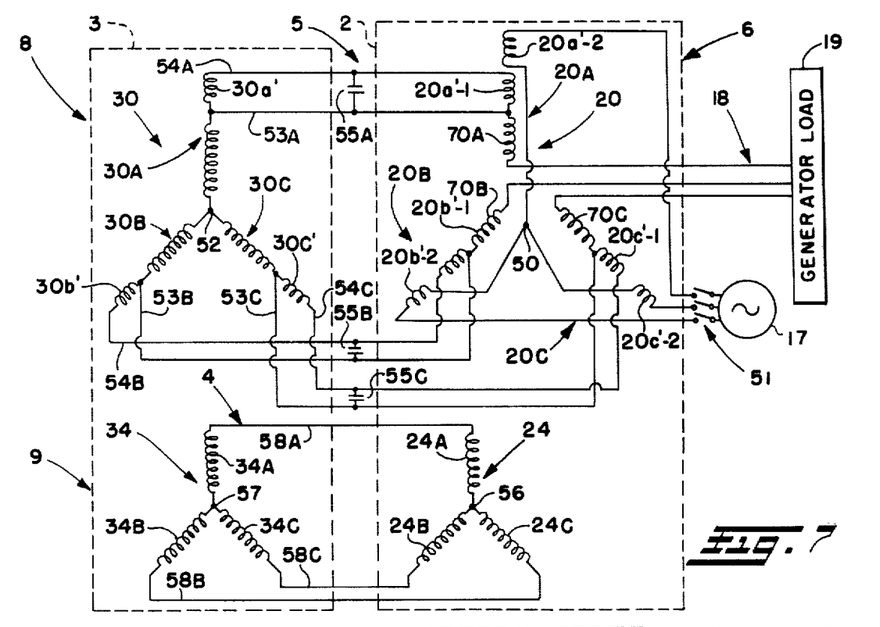

In accordance with the preferred embodiment and best mode of the invention, the stators 6,8 and rotors 7,9 all have the same pole number and all are wound for the same number of phases, preferably three phases. The machine 1 illustrated in FIGS. 1 and 2 and the circuit illustrated in FIG. 7 represents the preferred embodiment and best mode of the invention. In the machine 1 the exciter rotor 7 and generator rotor 9 are electrically connected directly in a phase-sequence manner by rotor leads 4 so that the rotational frequency in space of the magnetic field set up by the generator rotor 9 will be the same as that set up by the exciter stator 6; therefore, an open frequency loop is formed in effect from the exciter stator 6 through to the generator stator 8 so that the frequency of the AC electrical output from generator stator 8 will be the same as the frequency of the AC excitation signal input to the exciter stator 6. Such frequency loop, then, is closed by a direct connection, preferably a direct wire connection or other connection that preserves a direct frequency relation between the frequency of the AC electrical output and the AC excitation signal, via the stator leads 5 between the generator stator 8 and the exciter stator 6 so as to provide to the latter at least part of its AC excitation signal directly from the generator 3. Therefore, during operation of the machine 1, the frequency of the AC excitation signal to the exciter 2 and the frequency of the AC electrical output from the generator 3 will be maintained the same and constant over a relatively wide range of mechanical rotational frequencies of the rotors 7, 9.

Turning now to FIGS. 3 and 4, an alternate form of double induction dynamo electric machine in the form of a constant frequency alternator is generally indicated at 1'. The machine 1' is substantially the same as the machine 1 except that the rotor portions 7', 9' are formed of a common squirrel cage rotor structure 40; the two stators 6, 8 are electrically connected by stator leads 5' as in the embodiment of FIGS. 1 and 2.

In the machine 1' the exciter rotor portion 7' includes a laminated core structure 22' formed by a stack of relatively thin magnetic laminations 23' with grooves, slots, or openings 21' passing therethrough in a direction parallel to the axial extent of the shaft 10. The generator rotor portion 9' is similar, but larger, to the exciter rotor portion, and, accordingly, includes a laminated core structure 36' formed by a stack of relatively thin magnetic laminations 37' having grooves, slots, or openings 31' therein. Discrete rods, bars, or other electrical conductors 41 of copper, aluminum or brass or the like, are positioned in respective openings 21', 31' of the rotor portions 7', 9' extending fully through the air space 16 between the exciter 2 and generator 3. Preferably all of the conductors 41 are electrically connected in parallel by end rings at the opposite ends thereof at the outside faces 42, 43 of the respective rotor portions 7', 9'. Since each of the conductors 41 forms part of each rotor portion 7', 9', ordinarily it is undesirable to provide any further electrical connection between the rotor portions of the squirrel cage rotor structure 40. The rotor portions 7', 9' appear electrically in the machine 1' and operate to achieve the same end result, i.e. of constant frequency AC electrical output, as the wound rotors 7, 9 of the machine 1. The exciter stator 6 and generator stator 3 are wound for carrying AC electrical signals, may be wound in single phase or multiple phase configuration, with three phase configuration being preferred, preferably have the same pole number, and, as indicated above, are directly connected by the stator leads 5 to close a frequency loop between the exciter and generator. The squirrel cage rotor structure 40 is adapted for carrying AC electrical signals and automatically adapts itself to have the same pole number as the stators 6,8.

Figure 5:
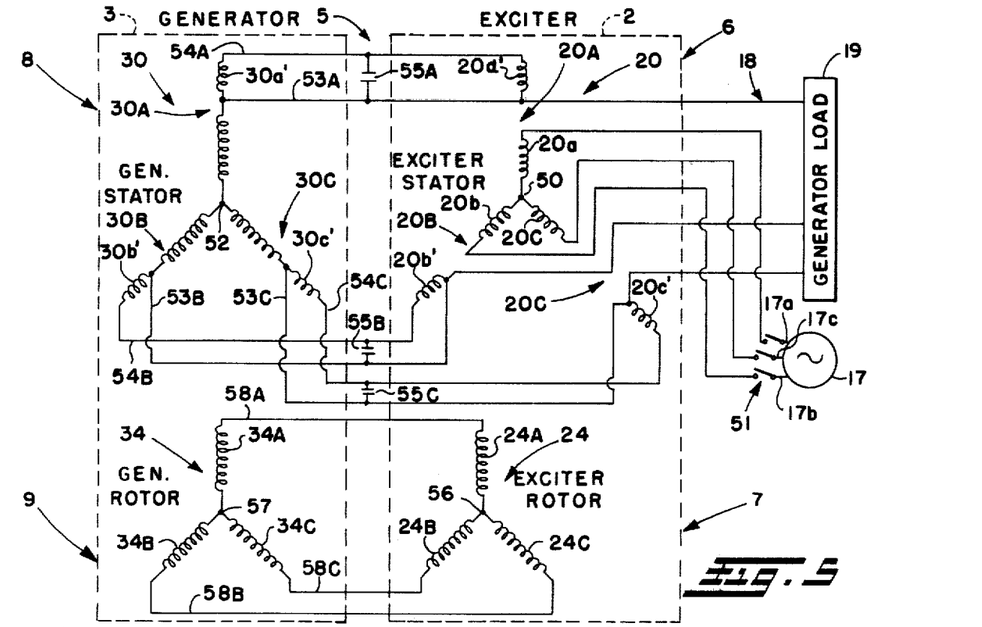
FIGS. 5-9 are schematic electric circuit diagrams of several embodiments of the dynamo electric machine in accordance with the present invention.

One schematic electric circuit diagram depicting according to the invention the manner in which the windings of the machine 1 may be formed and/or electrically connected is illustrated in FIG. 5. The exciter stator windings 20 are wound in a three phase configuration including respective phase windings 20A, 20B, 20C. Moreover, each of the phase windings, such as the winding 20A, is formed by two portions, such as a start winding portion 20a and a shunt winding 20a'. The start windings 20a, 20b, 20c are star connected having a common junction 50 and are energized by a three phase AC excitation signal from the control source 17. A ganged switch 51 will be closed during start-up of the machine 1 for supplying the control voltage on lines 17a-17c as the AC excitation signal to the exciter stator start windings 20a-20c; after start-up the switch 51 may be opened to disconnect the control source 17 or may remain closed to assist in maintaining the voltage of the AC electrical output under heavy load conditions.

The generator stator windings 30 also are of three phase configuration including three phase windings 30A, 30B, 30C, each of which has a tapped portion 30a', 30b', 30c' that ordinarily has a small number of turns relative to the total number of turns in each phase. The phase windings 30A-30C are electrically connected in star configuration at a common junction 52, and lines 53A, 53B, 53C connect with the output leads 18 to couple the three phase AC electrical output from the generator stator 8 to the load 19. The exciter stator shunt winding portions 20a', 20b', 20c' are connected across the respective tapped portions 30a', 30b', 30c' of the generator stator via the respective pairs of leads 53A-53C and 54A-54C, which are generally designated the stator leads 5. The exciter stator shunt winding portions 20a', 20b', 20c' alternatively may be connected to other tapped portions, such as to 30a', 30c', 30b', respectively, as long as the positive or negative phase rotation sequence obtained by such connections is maintained. Preferably the phase rotation of the start winding portions 29a, 20b, 20c relative to the control source 17 will be the same as for the shunt winding portions 20a', 20b', 20c'. If desired, one or more capacitors 55A-55C may be coupled in parallel with the tapped generator stator winding portions, as shown.

The exciter rotor windings 24 and the generator rotor windings 34 are are of respective three phase star connected configuration including phase windings 24A-24C and 34A-34C, respectively, coupled as shown at common junctions 56 and 57. Moreover, respective pairs of generator and exciter rotor phase windings are connected together by lines 58A-58C, in a manner such that the direction of rotating magnetic field due to current flow through the phase windings of the exciter rotor will be the same as the direction of rotationg magnetic field due to current flow through the phase windings of the generator rotor.

In operation of the machine 1 described above with reference to FIGS. 1 and 2 in which the exciter and stator are electrically connected as shown in FIG. 5, during start-up the prime mover 13 will cause the rotors 7, 9 to rotate, and the closed switch 51 will provide a three phase control voltage AC excitation signal to the three phase start winding portions 20a-20c of the exciter stator 6. A three phase AC signal, i.e. a voltage, then is induced in the three phase windings 24A-24C of the exciter rotor 7 which circulates the AC signal in the form of a current in the three phase windings 34A-34C of the generator rotor. The thus excited generator rotor in turn sets up a rotating magnetic field that induces a three phase voltage in the three phase windings 30A-30C of the generator stator, with such latter induced voltage being provided via lines 53A-53C and output leads 18 as the AC electrical output of the machine 1. Since the direction of rotating magnetic field due to current flow through the exciter rotor is the same as that due to the generator rotor, as was noted above, the frequency of the AC voltage induced in the generator stator, i.e. the AC electrical output of the machine 1, will be the same as that of the control source 17. The influence of the mechanical rotational frequency of the rotors 7, 9 accordingly is cancelled.

After start-up of the machine 1, i.e. after the prime mover 13 has brought the rotors 7, 9 up to a suitable steady state speed, the switch 51 may be opened to disconnect the control source 17. At this time, however, the frequency of the AC electrical output from the machine 1 ordinarily will have locked onto a frequency which is the same as that of the control voltage from the control source 17 due to the closed frequency loop of the machine. The exciter stator shunt windings 20a'-20c' then receive an AC excitation signal from the tapped winding portions 30a'-30c' of the generator stator. Therefore, the exciter stator shunt winding portions 20a'-20c' continue to set up a rotating magnetic field in the exciter 2 at the same rotational frequency and phase as that effected by the control source 17 and start winding portions 20a-20c. The AC signal will continue to be induced in the exciter rotor to cause circulation of current through the generator rotor, which in turn continues to maintain the AC electrical output of the machine at the frequency to which it was locked. If desired, the switch 51 may be left closed to continue connection of the control source 17 to the exciter stator 6 during steady state operation of the machine 1 to assist in maintaining the voltage of the AC electrical output generated by the machine 1 under heavy loading conditions of the generator stator 8.

Whenever generator stator tappings 30a', 30b', 30c' are used, (FIGS. 5, 6, 7, 8) the exciter winding portions, 20a', 20b', 20c', act as a highly inductive load thereon. This leads to a voltage drop in the tapping windings 30a', 30b', 30c' and consequently a reduction in power that the tappings deliver to the exciter stator, which may adversely affect the ability of the machine to operate efficiently solely in a self-exciting mode. The capacitors 55A-55C can be designed either to reduce or to eliminate this inductive load on tappings so as to keep the tapping voltages at a high level. In essence the capacitors aid self excitation and sustaining of the unit, so as to operate stably with or without the continuous use of control signal; also they facilitate efficient power transfer from generator stator to exciter stator.

The foregoing description with respect to FIG. 5 is applicable directly to operation of the machine 1 as illustrated in FIGS. 1 and 2. However, it will be appreciated that the circuit illustrated in FIG. 5, as well as those illustrated in the subsequent FIGS. 6-9, also may be employed in connection with the machine 1' described above with reference to FIGS. 3 and 4 to effect generating of a constant frequency AC electrical output therefrom.

Figure 6:
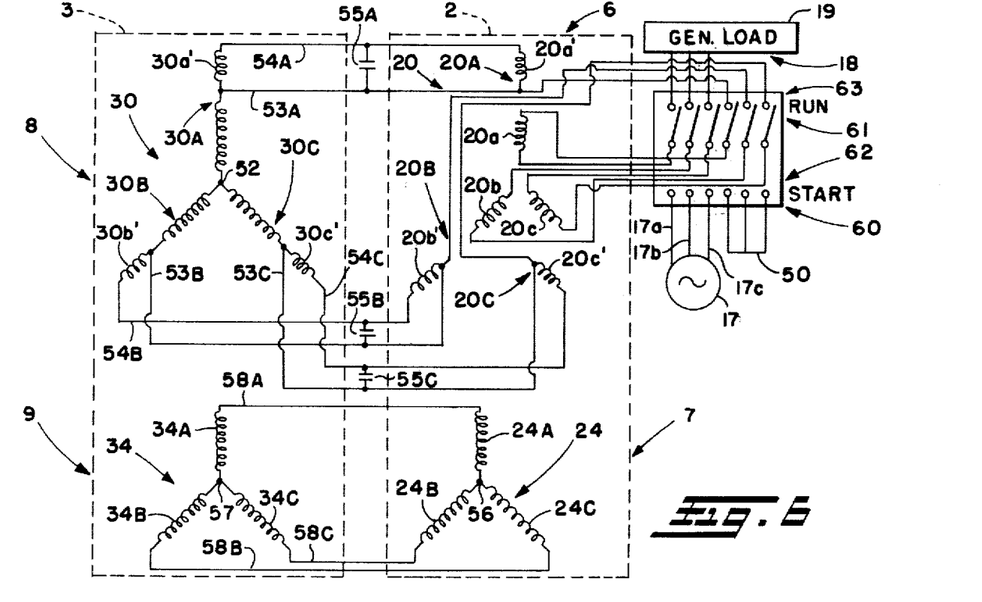

Another circuit configuration for the machine 1 and, as described above, adaptable for use in connection with the machine 1', is illustrated in FIG. 6. In such circuit the exciter rotor 7 and generator rotor 9 and the generator stator 8 are formed and connected in the manner described above with reference to FIG. 5. However, in this embodiment, the leads 53A-53C from the generator stator couple with the output leads 18 and load 19 only through connections provided by a switch 60. The switch 60 also provides variable connections for the exciter stator 6. For starting the machine 1 employing the circuit of FIG. 6, the switch 60 is thrown into the start position such that the movable contacts 61 thereof engage the fixed start contacts 62. The control source 17 then is connected through lines 17a–17c and three of the movable contacts 61 to the start winding portions 20a–20c of the exciter stator 6 to build up voltage in the generator stator 8. Three of the movable contacts 61 also connect the start winding portions 20a–20c to a common junction 50 so that such phase windings are effectively connected in star configuration. After the voltage of the AC electrical output produced on lines 53A–53C from the generator stator has built up to an adequate level the above described closed frequency loop effect and operation of the machine 1 proceeds. The movable contacts 61 of the switch 60 then are thrown into the run position so as to engage the respective fixed run contacts 63. The switch 60 then couples the exciter stator start winding portions 20a–20c in electrical series relation between the lines 53A–53C on which the AC electrical output is produced and the output leads 18. The exciter 6, then, is effectively electrically connected in a manner similar to that of U.S. Pat. No. 3,210,644 whereby the start winding portions 20a–20c are series or compound windings to provide a compounding effect carrying the load component of the AC electrical output so as further to enhance the voltage regulation capability of the machine 1, as is described further in such patent.

The connections illustrated in FIG. 7, which is the preferred embodiment and best mode, for the exciter rotor 7, generator rotor 9 and generator stator 8 are the same as those described above with reference to FIGS. 5 and 6. However, in the circuit of FIG. 7 the connections provided for the exciter stator 6 are modified in the following manner. The single individual shunt windings 20a'–20c' in FIG. 7 are divided into two preferably, although not necessarily, equal portions 20a'-1 through 20c'-1 and 20a'-2 through 20c'-2. The first group of winding portions 20a'–20c' are connected directly in shunt relation with the tapped generator stator winding portions 30a'–30c' and operate in the same manner as described above with reference to FIG. 5 and 6. The second group of shunt winding portions 20a'-2–20c' are connected directly with the control source 17 via the switch 51, which is closed during start-up and may be opened or closed during steady state operation of the machine 1, as above. In the exciter stator 6 of FIG. 7 a series or compound winding 70A–70C is connected in series circuit connection between the respective generator stator windings 30 and the output leads 18 to provide a continuous compounding effect and, thus, high level or capability of voltage regulation of the AC electrical output. Thus, the shunt winding portions 20a'-2 through 20c'-2 in the exciter stator 6 are employed as start windings to build up voltage in the machine during start-up employing the three phase control source 17. The other shunt winding portions 20a'-1 through 20c'-1 receive power directly from the tapped portions 30a'–30c' of the generator stator for the closed frequency loop operation of the machine. The compounding windings 70A–70C carry the load component of the AC electrical output current to provide the high level voltage regulation capability of the machine.

Figure 8:
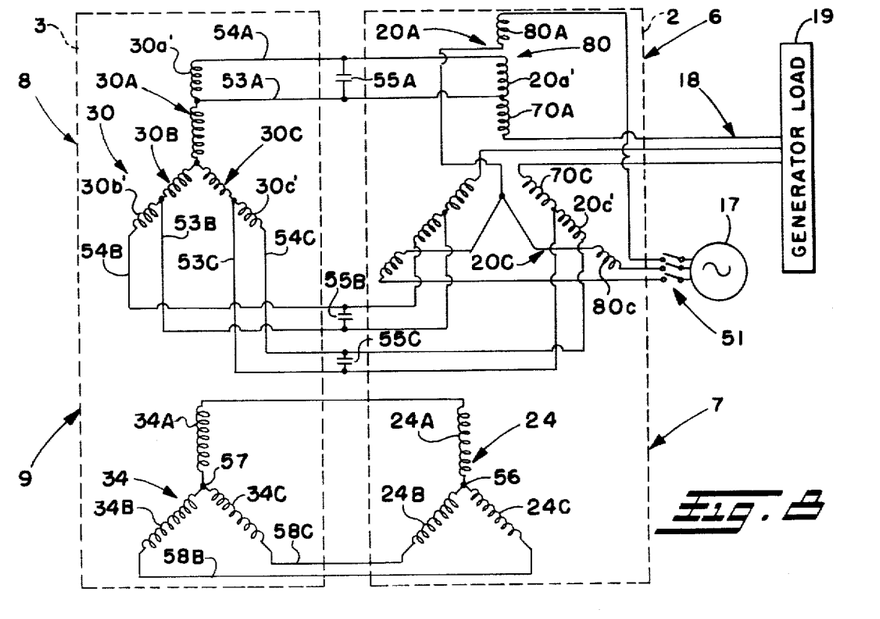

Turning now more specifically to FIG. 8, the connections for the exciter rotor 7, generator rotor 9, and generator stator 8 are the same as described above with reference to FIGS. 5–7. However, the exciter stator 6 includes an additional three phase start winding 80, with phase portions 80A, 80B, 80C star connected at one end and also connected via the switch 51 to the three phase control source 17. The exciter stator shunt windings 20a'–20c' are connected as aforesaid directly to the respective tapped portions of the generator stator windings 30 for closed frequency loop operation, and compounding windings 70A–70C provide the aforedescribed high level voltage regulation capability. As distinguished from the circuit of FIG. 7, where the shunt windings 20a'–20c' are divided into two portions, the exciter starting windings 80A–80C are separate from the shunt windings; they are used primarily for voltage build-up in the machine 1 during the start-up. After the machine is running, the switch 51 in FIG. 8 may be opened to disconnect the three phase control source 17 from the start windings 80A–80C, which then will have no effect on the steady state operation of the machine.

As is illustrated in FIG. 9, wherein the exciter rotor 7 and generator rotor 9 are connected and operate as above, the generator stator 8 does not have any tapped portions; rather, the individual three phase windings 30A–30C are connected by lines 54A–54C to compounding or series windings 90A–90C, respectively, and the latter are connected by the output leads 18 to the generator load 19. In addition to the compounding windings 90A–90C, the windings 20 of the exciter stator include AC excitation windings 91A–91C, which are continuously connected by lines 17A–17C to the three phase control source 17. The windings 90A–90C provide both the desired voltage regulation effect and the closing of the frequency loop for the machine 1. In addition, the excitation windings 91A–91C continuously provide excitation for the machine to assure constancy of both the frequency and voltage of the AC electrical output therefrom. By proper design of the compounding windings 90A–90C such windings effectively will control the input required under load from the control source 17.

STATEMENT OF INDUSTRIAL APPLICATION

In view of the foregoing, it will be clear that the machine of the present invention may be used to generate an AC electrical output that has a substantially constant frequency characteristic and irrespective of variations in shaft speed, and preferably also a constant or regulated voltage characteristic.

I claim:

1. A machine for producing a substantially constant frequency AC electrical output, comprising: exciter means for developing an AC signal, including relatively movable stator and rotor portions, generator means excited in response to such AC signal for generating such AC electrical output, including relatively movable stator and rotor portions, said exciter means and generator means being coupled to obtain a net cancellation of the influence of the fequency of such relative movement in the machine on the frequency of such AC electrical output, and coupling means for electrically coupling said generator means to said exciter means to provide an AC excitation signal to the latter at a frequency directly related to that of such AC electrical output.

2. The machine of claim 1, said exciter stator portion including winding means operative in response to an AC excitation signal for setting up an exciter magnetic field that rotates in space at a rotational frequency, said exciter rotor portion including responsive means responsive to such exciter magnetic field for developing such AC signal, said generator rotor portion including operative means responsive to such AC signal from said exciter rotor portion for setting up a generator magnetic field that rotates in space at the same rotational frequency as such exciter magnetic field.

3. The machine of claim 2, further comprising means for electrically connecting said exciter rotor portion and said generator rotor portion such that the direction of rotation of such generator magnetic field is the same as that of such exciter magnetic field.

4. The machine of claim 3, said exciter rotor portion and said generator rotor portion comprising wound rotor means for conducting such AC signal.

5. The machine of claim 4, said exciter rotor portion and said generator rotor portion comprising non-salient pole rotors.

6. The machine of claim 4, said means for electrically connecting comprising means for electrically connecting said wound rotor means in phase sequence relation.

7. The machine of claim 4, each of said wound rotor means comprising multiple phase windings, the multiple phase windings of each respective wound rotor means being electrically connected in star or delta configuration, and wherein said means for electrically connecting comprises means for electrically connecting both of said wound rotor means in phase sequence relation.

8. The machine of claim 2, further comprising an alternative means for electrically connecting said exciter rotor portion and said generator rotor portion such that the direction of rotation of such generator magnetic field is the same as that of such exciter magnetic field.

9. The machine of claim 8, said rotor portions comprising a squirrel cage rotor.

10. The machine of claim 8, said rotor portions comprising a common squirrel cage rotor, including an exciter rotor core in said exciter rotor portion in said exciter means and a generator rotor core in said generator rotor portion in said generator means, and conductors mounted on both of said cores and connected electrically in parallel with each other at the outside ends of the combined rotor.

11. The machine of claim 2, 3, 4, 8 or 10, further comprising means for mounting said rotor portions on a common shaft for rotation by a common prime mover.

12. The machine of claim 1, said coupling means comprising means for preserving a direct frequency relation between such AC electrical output and such AC excitation signal.

13. The machine of claim 12, said coupling means comprising a direct non-frequency changing connection.

14. The machine of claim 12, said coupling means comprising a direct wire connection.

15. The machine of claim 12, said coupling means comprising means for closing a frequency loop between said generator means and said exciter means, whereby the frequency of such AC electrical output is a function of such AC excitation signal and the same as the frequency of the latter and the frequency of such AC excitation signal is the function of such AC electrical output and the same as the frequency of the latter during steady state operation.

16. The machine of claim 15, said exciter stator portion including winding means operative in response to an AC excitation signal for setting up an exciter magnetic field that rotates in space at a rotational frequency, said exciter rotor portion including responsive means responsive to such exciter magnetic field for developing such AC signal, said generator rotor portion including operative means responsive to such AC signal from said exciter rotor portion for setting up a generator magnetic field that rotates in space at the same rotational frequency as such exciter magnetic field, whereby the frequency of such AC signal is a function of the frequency of such AC excitation signal, the pole number of said exciter stator portion and said exciter rotor portion, and the rotational frequency of said exciter rotor portion with respect to said exciter stator portion, and the frequency of such AC electrical output is a function of the frequency of such AC signal, the pole number of said generator rotor portion and generator stator portion, and the rotational frequency of said generator rotor portion with respect to said generator stator portion.

17. The machine of claim 16, wherein the number of phases for each of said exciter stator and rotor portions and generator stator and rotor portions is the same.

18. The machine of claim 16 or 17, wherein the pole number for each of said exciter stator and rotor portions and generator stator and rotor portions is the same.

19. The machine of claim 1, each of said generator stator portion and exciter stator portion including at least one winding, and said coupling means comprising means for coupling at least a portion of said windings in shunt relation.

20. The machine of claim 19, wherein said portion of said generator stator winding comprises a tapped portion thereof.

21. The machine of claim 19, further comprising a respective shunt capacitor in shunt connection with each of said shunt connected windings.

22. The machine of claim 19, wherein each of the windings of said exciter means and generator means is a multiple phase winding.

23. The machine of claim 22, wherein each of said multiple phase windings comprises a three-phase winding.

24. The machine of claim 22, wherein the phase number for each of said windings of said exciter means and said generator means is the same.

25. The machine of claim 22, wherein said windings are respectively star or delta connected.

26. The machine of claim 22, wherein each of said exciter means and generator means has the same pole number.

27. The machine of claim 1 or 2, further comprising supply means for supplying a reference signal at a reference frequency, said exciter stator portion including a start winding portion responsive to such reference signal for producing at least an initial AC excitation signal during start-up of the machine.

28. The machine of claim 27, further comprising switch means for selectively connecting and disconnecting said supply means to said start winding portion.

29. The machine of claim 28, wherein each of the windings of said exciter means and stator means comprises a multiple phase star or delta connected winding.

30. The machine of claim 29, said switch means including means operable in one condition for connecting said start winding portions to said supply means and operable in a second condition for connecting said start winding portions in electrical series with at least a portion of respective generator stator windings to obtain compounding during steady state operation.

31. The machine of claim 27, each of said generator stator portion and said exciter stator portion comprising at least one winding, and said coupling means including means for respectively coupling at least a portion of each of said at least one generator stator winding and said exciter stator winding in electrical series.

32. The machine of claim 31, wherein each such portion of said exciter stator winding comprises a tapped portion of said at least one winding thereof.

33. The machine of claim 31, wherein said at least one winding of said exciter stator portion comprises two separate in phase windings and such portion of said exciter stator winding comprises one of said separate windings.

34. The machine of claim 1, said generator stator and exciter stator respectively including windings, said coupling means including means for coupling at least a portion of each of said generator stator windings and of said exciter stator windings in electrical series.

35. The machine of claim 34, wherein such portion of said exciter stator winding comprises a tapped portion of said exciter stator winding.

36. The machine of claim 34, wherein said exciter stator winding comprises two separate in phase exciter stator windings and such portion of said exciter stator winding comprises one of said separate windings.

37. The machine of claim 34, wherein each of said exciter stator portion and said generator stator portion comprises a multiple phase star connected winding.

38. The machine of claim 1, each of said generator stator and exciter stator including at least one winding, and said coupling means comprising means for coupling at least a portion of each of said windings in electrical series relation, whereby at least part of the load current portion of such AC electrical output passes in said portion of said exciter stator winding to obtain compounding.

39. The machine of claim 1, wherein said exciter stator portion comprises a multiple phase wound stator with at least one exciter phase winding for each phase, each exciter phase winding including a shunt winding portion and a start winding portion, and said generator stator comprises a multiple phase wound stator with the same number of generator stator phase windings as the number of said exciter phase windings, and said coupling means comprises means for electrically coupling said shunt winding portions in shunt relation with at least a part of respective generator stator phase windings.

40. The machine of claim 39, wherein said exciter means and said generator means have the same pole number.

41. The machine of claim 1, said generator stator portion including at least one generator stator winding and said exciter stator portion including at least one exciter stator winding, said coupling means including means for coupling at least a portion of the electrical signal induced in at least a portion of said generator stator winding to at least a portion of said exciter stator winding.

42. The machine of claim 1, said generator stator portion including at least one generator stator winding and said exciter stator portion including at least one exciter stator winding, said coupling means including means for coupling at least a portion of said exciter stator winding in shunt relation with at least a portion of said generator stator winding.

43. The machine of claim 42, said generator stator winding including a tapped portion and said coupling means being connected to couple said portion of said exciter stator winding in shunt relation with said tapped portion.

44. The machine of claim 1, further comprising means for supplying an AC reference signal at a control frequency to the machine to cause the same to produce such AC electrical output at a frequency corresponding to such control frequency.

45. The machine of claim 44, said means for supplying including means for disconnecting such AC reference signal after start-up of the machine.

46. The machine of claim 44, further comprising a control source for producing such AC reference signal.

47. The machine of claim 44, said means for supplying including means for continuing to supply such AC reference signal to the machine during the steady state operation thereof.

48. The machine of claim 1, said generator rotor portion comprising a wound rotor.

49. The machine of claim 1, said generator rotor portion comprising a round rotor.

50. The machine of claim 1, said generator rotor portion comprising a non-salient pole rotor.

51. The machine of claim 1, said generator rotor portion comprising a squirrel cage rotor.

52. The machine of claim 1, said generator rotor portion comprising conductive means for carrying an AC electrical signal.

53. The machine of claim 1, said exciter rotor portion comprising a wound rotor.

54. The machine of claim 1, said exciter rotor portion comprising a round rotor.

55. The machine of claim 1, said exciter rotor portion comprising a non-salient pole rotor.

56. The machine of claim 1, said exciter rotor portion comprising a squirrel cage rotor.

57. The machine of claim 51 or 56, said squirrel cage rotor comprising a squirrel cage rotor common to both of said exciter rotor portion and generator rotor portion.

58. The machine of claim 1, said exciter rotor portion comprising conductive means for carrying an AC electrical signal.

59. The machine of claim 1, said generator stator portion comprising a wound stator.

60. The machine of claim 59, said wound generator stator including a tapped portion, and said coupling means including means for coupling said tapped portion in shunt relation with at least part of said exciter stator portion.

61. The machine of claim 59, said wound generator stator including multiple phase windings.

62. The machine of claim 61, said wound generator stator comprising a three phase winding.

63. The machine of claim 61, said multiple phase wound generator stator comprising conductive means for carrying an AC electrical signal.

64. The machine of claim 1, said exciter stator portion comprising a wound exciter stator.

65. The machine of claim 48, 50, 53, 55, 59, 60, or 64, wherein each of said stators and rotors comprises a core including a stack of magnetic laminations having grooves or slots therein, and wherein the windings of said stators and rotors are positioned in respective grooves.

66. The machine of claim 1, further comprising means for mounting said rotor portions for rotation within a volume circumscribed by said respective stator portions.

67. The machine of claim 1, further comprising common mounting means for mounting said rotor portions on a common support for rotation by a common prime mover.

68. The machine of claim 1, wherein said exciter stator portion includes means responsive to such AC excitation signal for setting up an exciter magnetic field that rotates in space at a field rotational frequency, and said generator rotor portion includes means for setting up a rotating magnetic field that rotates in space at such field rotational frequency to induce in said generator stator portion such AC electrical output at the same frequency as such AC excitation signal.

69. The machine of claim 68, wherein said coupling means includes means for providing such AC excitation signal while preserving a direct frequency relation between the latter and such AC electrical output.

70. The machine of claim 69, said generator stator portion including at least one winding having a tapped portion, and said exciter stator portion including a stator winding portion corresponding in phase, pole number and relative position with respect to said at least one winding, and said coupling means including a direct wire connection for coupling said stator winding portions in shunt relation with respective tapped portions of said generator stator windings.

71. The machine of claim 70, wherein said stator portions and rotor portions have the same number of phases and pole number.

72. The machine of claim 1, wherein said coupling means includes means for preserving a direct frequency relation between such AC electrical output and such AC excitation signal.

73. The machine of claim 72, said means for preserving including a direct non-frequency changing connection.

74. The machine of claim 73, said connection comprising a direct wire connection.

75. The machine of claim 72, said means for preserving including means for closing a frequency loop for such machine whereby the frequency of such AC electrical output is the same as that of such AC excitation signal, and the frequency of such AC excitation signal is the same as that of such AC electrical output.

76. The machine of claim 75, said generator stator portion including at least one winding having a tapped portion, and said exciter stator portion including a respective stator winding portion corresponding in phase, pole number and relative position with respect to each of said at least one winding, and said coupling means including a direct wire connection for coupling said stator winding portions in shunt relation with respective tapped portions of said generator stator windings.

77. The machine of claim 72, further comprising means for coupling such AC signal in said exciter rotor portion to said generator rotor portion.

78. The machine of claim 77, said means for coupling comprising means for connecting said exciter rotor portion and generator rotor portion in phase sequence relation.

79. The machine of claim 78, wherein each of said exciter rotor portion and generator rotor portion comprises multiple phase windings.

80. The machine of claim 79, wherein each of said rotor portions has the same number of phases and the same pole number, and said means for coupling such AC signal including means for directing the flow of current through respective windings of said generator rotor portion.

81. The machine of claim 77, wherein said rotor portions comprise a common squirrel cage rotor.

* * * * *